United States Patent
Bozionek et al.

(10) Patent No.: US 9,335,829 B2
(45) Date of Patent: *May 10, 2016

(54) METHOD FOR CAPTURING AND TRANSMITTING MOTION DATA

(71) Applicant: Unify GmbH & Co. KG, München (DE)

(72) Inventors: Bruno Bozionek, Borchen (DE); Karl Klaghofer, Munich (DE); Holger Prange, München (DE); Michael Tietsch, Kaufering (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,998

(22) Filed: Jul. 10, 2015

(65) Prior Publication Data

US 2015/0316997 A1  Nov. 5, 2015

Related U.S. Application Data

(63) Continuation of application No. 13/263,832, filed as application No. PCT/EP2011/000408 on Jan. 28, 2011, now Pat. No. 9,110,511.

(30) Foreign Application Priority Data

Feb. 17, 2010  (DE) .................. 10 2010 008 301

(51) Int. Cl.
  *G06F 3/01*  (2006.01)
  *G06F 3/00*  (2006.01)
  (Continued)

(52) U.S. Cl.
  CPC ............... *G06F 3/017* (2013.01); *G06F 3/005* (2013.01); *G06F 3/011* (2013.01); *G06F 3/038* (2013.01);
  (Continued)

(58) Field of Classification Search
  None
  See application file for complete search history.

(56) References Cited

U.S. PATENT DOCUMENTS

2006/0161992 A1   7/2006  Kempf
2007/0264988 A1*  11/2007 Wilson, Jr. .......... H04L 12/1813
                                                      455/416

(Continued)

FOREIGN PATENT DOCUMENTS

CN    1864397 S     11/2006
DE   10019165 A1    10/2001

(Continued)

OTHER PUBLICATIONS

Written Opinion of the International Searching Authority for PCT/EP2011/000408 dated Aug. 21, 2012 (Form PCT/ISA/237) (German Translation).

(Continued)

*Primary Examiner* — Ryan A Lubit
(74) *Attorney, Agent, or Firm* — Buchanan Ingersoll & Rooney PC

(57) ABSTRACT

In a method for capturing and transmitting motion data (s1) from a transmitter (103, 203) to a receiver (104, 204), motion data is captured by a capturing device (102, 202) at the transmitter end, said capturing device (102, 202) registering the motion of an object (106, 206) by means of at least one sensor (101, 201) and converting the registered motion into a digital signal (i2). Said digital signal is fed to the receiver, which embeds the data of the digital signal (i2) in a series (i3) of data and transmits said series of data to a receiver. In addition to or instead of the data of the digital signal, the series of data transmitted by the transmitter contains context data which the receiver uses to interpret and process the originally captured motion data within a defined context.

20 Claims, 2 Drawing Sheets

(51) Int. Cl.
*G06F 3/038* (2013.01)
*H04L 29/06* (2006.01)
*H04Q 9/00* (2006.01)
*H04W 4/20* (2009.01)

(52) U.S. Cl.
CPC .............. *H04L 65/1096* (2013.01); *H04Q 9/00* (2013.01); *H04W 4/206* (2013.01); *H04Q 2209/82* (2013.01)

(56) References Cited

U.S. PATENT DOCUMENTS

| | | | |
|---|---|---|---|
| 2008/0211768 A1* | 9/2008 | Breen | G06F 3/012 345/157 |
| 2009/0219224 A1* | 9/2009 | Elg | G06F 3/012 345/8 |
| 2010/0169842 A1* | 7/2010 | Migos | G06F 3/04883 715/863 |
| 2010/0214214 A1* | 8/2010 | Corson | G06F 3/0346 345/158 |
| 2011/0187640 A1 | 8/2011 | Jacobsen et al. | |
| 2011/0196969 A1 | 8/2011 | Tarte et al. | |

FOREIGN PATENT DOCUMENTS

| | | |
|---|---|---|
| DE | 10155044 A1 | 8/2002 |
| DE | 202008011939 U1 | 1/2009 |
| EP | 1594287 B1 | 11/2005 |
| WO | 2009118183 A2 | 10/2009 |

OTHER PUBLICATIONS

Written Opinion of the International Searching Authority for PCT/EP2011/000408 dated Aug. 21, 2012 (Form PCT/ISA/210) (English Translation).
International Preliminary Report on Patentability for PCT/EP2011/000408 dated Aug. 21, 2012 (Forms PCT/IB/373, PCT/ISA/237) (German Translation).
International Preliminary Report on Patentability for PCT/EP2011/000408 dated Aug. 21, 2012 (Forms PCT/IB/373, PCT/ISA/237) (English Translation).
R. Bolla et al., "Social Networking and Context management for the Future 3D Internet" Information Science and Technologies.
Atul Puri et al., "MPEG-4: An object-based multimedia coding standard supporting mobile applications" Mobile Networks and Applications 3, (1998).
Todesco, G et al., "MPEG-4 Support to Multiuser Virtual Environments" Computer Science Department, Sao Carlos Federal University Deutsches Patent Und Markenamt, May 6, 2010.
Dr. Jurgen Lohr, "Die Standards MPEG-4 und MPEG-7 in den Multimedia-Diensten".
"Wie funktioniert digitales Fernsehen? Von FBAS und PAL zu MPEG und digitaler Modulation" Bulletin SEV/AES Mar. 2008.
Schulzrinne, H. et al.: RFC: 3550: "RTP: A Transport Protocol for Real-Time Applications", Jul. 2003.
Handley, M. et al.: RFC 4566: "SDP: Session Description Protocol", Jul. 2006.
Rosenberg, Schulzrinne et al.: RFC 3261: "SIP: Session Initiation Protocol", Jun. 2002.
Schulzrinne et al.: RFC 1889: "RTP: A Transport Protocol for Real-Time Applications", Jan. 1996.
International Search Report for PCT/EP2011/000408 dated May 19, 2011 (Form PCT/ISA/2010) (German Translation).
International Search Report for PCT/EP2011/000408 dated May 19, 2011 (Form PCT/ISA/2010) (English Translation).
Written Opinion of the International Searching Authority for PCT/EP2011/000408 dated May 19, 2011 (Form PCT/ISA/2010) (German Translation).

* cited by examiner

METHOD FOR CAPTURING AND TRANSMITTING MOTION DATA

CROSS-REFERENCE TO RELATED APPLICATIONS

This application is a continuation application of U.S. patent application Ser. No. 13/263,832, which is the United States national phase under 35 U.S.C. §371 of PCT International Patent Application No. PCT/EP2011/000408, filed on Jan. 28, 2011 and claiming priority to German Application No. 102010008301.1, filed on Feb. 17, 2010.

BACKGROUND OF THE INVENTION

1. Field of the Invention

Embodiments of the invention relate to the transmission and use of motion capture information.

2. Background of the Related Art

The use of information technology devices to capture and transmit motion information is becoming increasingly common. For instance, in the development of user interface surfaces, motion information from users generated by means of motion captured by a sensor is more commonly being used to replace keyboard entries.

BRIEF DESCRIPTION OF THE INVENTION

Embodiments provide methods for capturing motion information, in which a capturing device at the transmitter end registers the motion of an object, by means of at least one sensor, and converts it into a digital signal that is fed to the transmitter. The transmitter embeds the data from the digital signal fed to it by the capturing device in a data sequence and transmits this data sequence to a receiver. In addition to or instead of data from the digital signal, the data sequence sent by the transmitter contains context data that the receiver uses to process the originally captured motion information within a defined context.

DETAILED DESCRIPTION OF THE INVENTION

Figure 1:
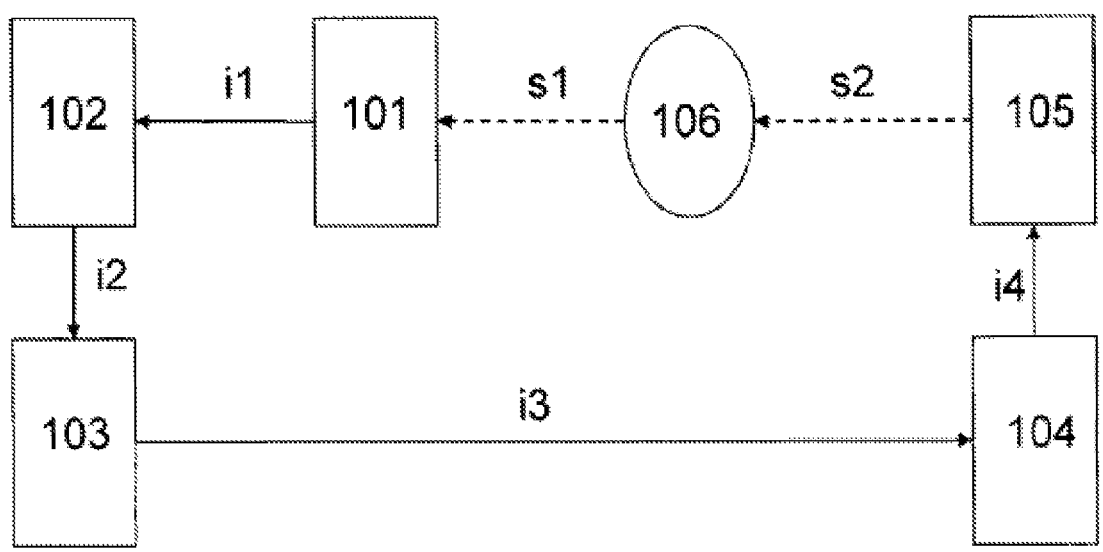
FIG. 1 a first preferred embodiment of this invention.

According to embodiments of the invention, in addition to or instead of data from the digital signal, the data sequence sent by the transmitter contains context data that the receiver uses to process the originally captured motion information within a defined context. This feature is based on the assumption that the movements of an object can have certain meanings within a defined context, which may differ depending on the context. For example, in many cases a person nodding his head indicates assent. Shaking the head, on the other hand, in many cases indicates refusal or lack of assent.

However, contexts are also conceivable in which a sideways head motion directs the observer's attention to the indicated side, or in which a nod of the head means "vertical" or "upward." The same is true for movements of other body parts or the entire body of a person. A human observer will generally be able to interpret the meaning of such motions correctly within a defined context.

If the motion information is to be interpreted and further processed by a machine, it will generally be helpful if the interpreting machine at the receiving end is provided with references, coming from the transmitter or from a device connected to it, as to how the motions are to be interpreted. These references will generally be in the form of text strings, such as keywords or textual explanations of the motion occurrence.

Continuing with the head motion example, the following possible context data are conceivable, depending on the situation: "Yes/No/move upward/move downward/move to the right/move to the left." These context data can be further confirmed by providing spatial coordinates and time input. However, it is conceivable for context data to be transmitted instead of such spatial coordinates or time inputs, because the meaning of the motion information is already completely clear from its context data.

In the description of this invention, motion information should be understood to mean any type of information that allows conclusions to be drawn regarding the movement of an object such as a human user of an information technology device. In particular, such information should be understood to include that acquired by a capturing device using a sensor. Typical examples of such information are video sequences or data derived or extracted from such video sequences, such as motion vectors or similar information. The concept should further include any type of data that can be inferred from such information, such as spatial coordinates, velocities, acceleration rates of moving objects with or without related time references, or similar information.

In the description of the invention, a capturing device should be understood to mean any type of device or equipment that is capable of capturing motion information from objects and converting it into a digital signal. Such a capturing device uses or contains one or more sensors for this purpose. Examples of such sensors are video cameras, acceleration sensors, magnetic detectors, or similar devices.

Because the motion information is derived from natural origins, the data collected by the sensor are generally in analog form. They must be converted into a digital format for further digital processing. The concepts of "digital signal" and "digital data" that are commonly recognized in this field are herein used synonymously in describing this invention. Similarly, a digital signal that can vary over time should be understood to mean a sequence of data over time.

Data or data sequences can be embedded in other data sequences such that, by adding one or more first data sequences to a second data sequence, a third data sequence can be created that contains the first and second data sequences as partial sequences within it. In this way, the sequential order of the data over time can be changed. A typical example of such embedding often seen in this field is inputting a first data set into a second data set that consists of address information or routing information, for example, and in which user data that are to be sent with the help of this address and routing information are embedded. Such data sets or data sequences are also often designated as data packets.

All concepts used in connection with the description of this invention should be understood as having the meanings commonly understood by those familiar with the field, based on their specialized or common knowledge.

The invention is described below in more detail based on preferred exemplary embodiments and with reference to the figures.

Embodiments are based on the idea, for capturing and transmitting motion information from a transmitter to a receiver, of first capturing this motion information s1, wherein a capturing device 102, 202 at the transmitter end 103, 203 registers the motion of an object 106, 206, by means of at least one transmitter sensor 101, 201, and converts it into a digital signal i3 that is fed to the transmitter 103, 203. The transmitter embeds the data from the digital signal i2, fed to it from the capturing device, in a data sequence i3 and transmits this data sequence to a receiver 104, 204. In addition to or instead of data from the digital signal, the data sequence sent by the transmitter contains context data used by the receiver to process the originally captured motion information within a defined context.

As shown schematically in FIG. 1, the sensor 101 detects the movements of an object—e.g., a person—and initially converts the motion information s1 into an analog sensor signal i1. These analog sensor data are then converted by a capturing device 102 into digital data i2 and fed to a transmitter 103. The transmitter embeds these digital data in a data sequence i3 and sends this data sequence to a receiver 104. The receiver 104 can then use the received data, which contain the motion information from the object 106, to process that information and use it to output user data s2, for example. For this purpose, the receiver can send a piece of information i4 to an output device 105, which then outputs the user information s2.

Figure 2:
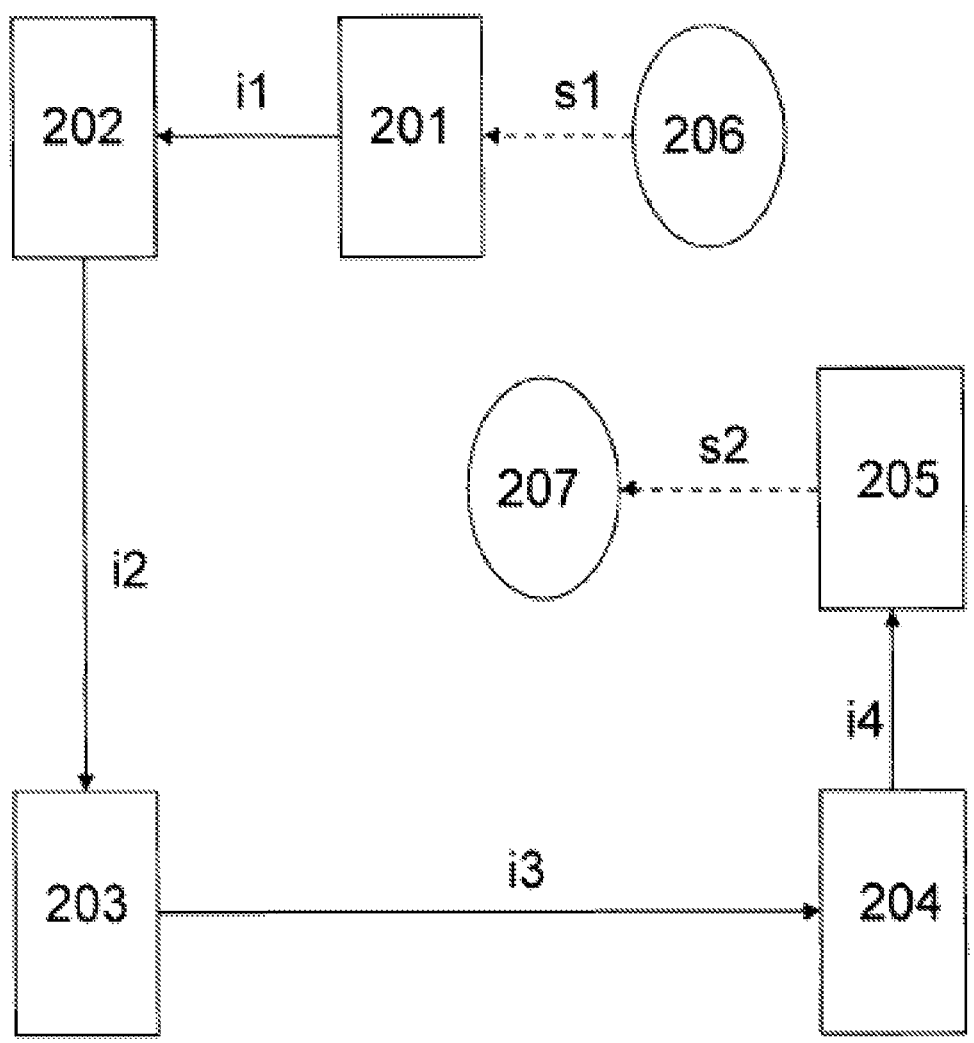
FIG. 2 an additional preferred embodiment of this invention.

As shown schematically in FIG. 2, the user 206 whose motion information s1 is captured and a user 207 to whom the user information s2 is provided by means of output device 205 do not have to be the same person. The exemplary embodiment in FIG. 1 is appropriate for controlling the interaction of a user 106 with an information system by means of body movements, for example. The exemplary embodiment of the invention shown in FIG. 2 is appropriate primarily for using motion information s1 to transmit a message from a user 206 to a second user 207 who may be at a different location. The user does not necessarily have to be a person. It can also be a system that is capable of interpreting this user information. For example, "nod head" or "shake head" may be used to move through a voice menu.

According to the invention, in addition to or instead of data from the digital signal i2, the data sequence i3 sent by the transmitter 103, 203 contains context data that the receiver 104, 204 uses to process the originally captured motion information i1 within a defined context. This feature of the invention is based on the assumption that the movements of an object 106 can have certain meanings within a defined context, which may differ depending on the context. For example, in many cases a person nodding his head indicates assent. Shaking the head, however, in many cases indicates refusal or lack of assent.

However, contexts are also conceivable in which a sideways head motion directs the observer's attention to the indicated side, or in which a nod of the head means vertical or upward. The same is true for movements of other body parts or the entire body of a person. A human observer will generally be able to interpret the meaning of such motions correctly within a defined context.

If the motion information is to be interpreted and further processed by a machine, it will generally be helpful if the interpreting machine at the receiving end is provided with references, coming from the transmitter or from a device connected to it, as to how the motions are to be interpreted. These references will generally be in the form of text strings, such as keywords or textual explanations of the motion occurrence.

Continuing with the head motion example, the following possible context data are conceivable, depending on the situation: "Yes/No/move upward/move downward/move to the right/move to the left." These context data can be further confirmed by providing spatial coordinates and time input. However, it is conceivable for context data to be transmitted instead of such spatial coordinates or time inputs, because the meaning of the motion information is already completely clear from its context data.

In a preferred embodiment of the invention, the transmitted motion information enables the receiver to output the user information s2 corresponding to that motion information. Therefore, for example, if the sensor registers a sideways head movement, a piece of user information in the form of a "move to the right" text string is output to the receiver. Depending on the related application, it may be advantageous for the user information to be output optically and/or acoustically. This is especially easy to accomplish if the context information already contains the message to be output, so that on the receiving end the corresponding text message simply has to be displayed optically or output acoustically using a voice synthesizer.

This invention is also advantageously suited for transmitting motion information via a packet-based network. Because the invention transmits the captured motion information in data sequence form anyway, it is easy to embed these data sequences in the packets required by certain protocols and send them in this way. Important examples of such network protocols are the Internet protocol and its related protocols, such as the Session Initiation Protocol (SIP), Session Description Protocol (SDP), or the related Real-Time Transport Protocol (RTP). This is briefly explained below using the example of a SIP Info Message.

The Session Initiation Protocol (SIP) is a network protocol used to create, control, and terminate a communication session involving two or more participants. The protocol is specified in RFC3261, among others. SIP is a commonly used protocol for IP telephony. One possibility is to handle the transmission of the actual motion information in the SIP protocol, or a "motion transmission protocol" can be generated in the SDP.

The Session Description Protocol (SDP) is described in RFC4566. This protocol is used within the SIP protocol to generate the parameters for RTP communication. The capabilities of the participating communication terminals are defined here (supported Codecs, Codec parameters, IP addresses, and ports). In a preferred exemplary embodiment of this invention, motion parameters such as formats are traded between terminals for later transmission of the motion information.

The Real-Time Transport Protocol (RTP) is a protocol for continuous transmission of audiovisual data (streams) via IP-based networks. The protocol was first standardized in RFC 1889 in 1996. An updated RFC was published in 2003. RFC 3550 replaced RFC 1889 at that time. It is used to transport multimedia data streams (audio, video, text, etc.) via networks, i.e., encoding, packetizing, and sending the data. RTP is a packet-based protocol and is normally operated using UDP. RTP can be used either for Unicast connections or for Multicast communication on the Internet. RTP is used in many areas, including use in IP telephone technologies H.323 and SIP to transmit audio/video streams of the conversation. The primary function of RTP is to transmit real-time-sensitive data streams that direct and control the data transmission during protocols such as the Session Description Protocol (SDP) or the Real-Time Streaming Protocol (RTSP).

In the so-called Backus-Naur Form (BNF notation), this protocol can be expanded to transmit motion information, as in the following example:

motion=("Motion") HCOLON motion-spec
motion-spec=(coord-spec/time-spec/context-spec)*(SEMI motion-spec)
coord-spec=("x="/"y="/"z=")*(DIGIT)
time-spec="time="*(DIGIT)
context-spec="context=" ("yes"/"no"/"move_up"/"move_down"/"move_right"/"move_left").

From the example of a modified SIP INFO message given here, it can be seen that a new SIP protocol element was added in order to transmit this type of information. In this example, a "motion header field" is added to the SIP protocol and includes the relative changes in the respective direction, i.e., in the X, Y, Z direction, as well as the time interval within which these changes are applied. In information technology, metadata are designated as a "header" at the beginning of a file or data block. They can be used to describe the file format or for other inputs such as the origin of the data.

It is also conceivable to measure and transmit acceleration values, i.e., the relative deviation from the last position, instead of motion values. In addition, this new header field contains an optional context parameter to which certain context values can be assigned by the transmitter of the SIP message. For example, for certain application cases where in the context "move_left" is sent, it causes a certain action in the SIP server.

In this way, an SIP server is not burdened with calculating the X, Y, Z values and times and determining a possible action; instead this server can simply use the context value. In addition, this context value can also be calculated at the "client end", i.e. from the side of one or more so-called clients, so that it expresses the participant's specific capabilities. For example, a handicapped participant cannot always make the same motions as an able-bodied participant. However, if the client at that participant's end is configured so that it can interpret the specifically reduced movements of that participant and assign the correct context, then that client can assign the appropriate context parameters to the message.

That SIP INFO message is then sent to the SIP server, which can initiate the appropriate actions. For example, information such as nods, shakes, or directional indications of the head can be detected and related information can be displayed on a screen.

A further variation is to transmit this information in RTP data streams via so-called events. In this case, motion information is transmitted from terminal to terminal, i.e., from SIP phone to SIP phone. For this application case, new so-called "named events" are defined and are transmitted "end-to-end" to the other terminal (SIP device). This other SIP device can be a voice menu system, for example, that initiates certain actions based on a nod or shake of the head.

This invention thus proposes a method by which, using a device that captures motion information and makes that information available to a SIP phone, the information is transmitted within the SIP protocol by means of a new SIP header field or within the RTP protocol as an event. Such a device can be a headset that contains motion sensors, for example, or it could also be a type of joystick.

A headset is a combination of headphones and microphone that permits two-way communication (hearing and speaking). In the German-speaking world it is commonly designated by the English term "headset."

SIP phones are a type of telephone that is based on Voice-over-IP and uses the Session Initiation Protocol (SIP). The conversation is sent over the Internet in individual data packets. SIP phones can consist of a standalone device (hard phone), a telephone adapter plus a standard telephone, or a software solution on a PC or PDA (soft phone). There are both cabled (generally Ethernet) and wireless (generally WLAN) variations.

Information (regarding the X direction, Y direction, Z direction, for example) is transmitted from the headset to the SIP phone and there is input into the SIP protocol. The SIP protocol can be expanded for this as follows:
INFO sip:sipserver.de:5060 SIP/2.0
Max-Forwards: 70
Content-Length: 0
Via: SIP/2.0/UDP 192.168.1.100:5060; branch=z9hG4bKd9ef3b8fa
Call-ID: 675c30257bcc371
From: sip:1000@192.168.1.100;tag=5c2ff2291b64b21
To: sip:2000@192.168.1.88
CSeq: 17 INFO
Motion: x=1;y=44;z=34;time=10;context=move_left In a preferred embodiment of the invention, the communication modalities are agreed upon between the transmitter and the receiver by means of a protocol that allows the motion information to be transmitted using a data format intended specifically for that purpose. Such a communication modality agreement protocol can be the Session Initiation Protocol (SIP), for example, which can be expanded for the purposes of this invention as shown in the exemplary embodiment described above, for example. Here the data format can preferably allow for the transmission of spatial coordinates, time inputs, and context data. In a preferred exemplary embodiment of the invention, the motion information is transmitted by means of a suitable protocol such as the Real-Time Transport protocol (RTP).

The invention claimed is:

1. A method for capturing and transmitting motion information, comprising:
   receiving, by a first communication terminal, a digital signal, data of the digital signal comprising features derived or extracted from video sequences;
   determining context data based on the data of the digital signal by the first communication terminal;
   sending the context data by the first communication terminal together with the data from the digital signal or instead of the data from the digital signal, to a receiver, the context data describing a gesture made by the object by identifying a relative change in a relative direction of the object and a meaning of that identified relative change, the first communication terminal having a Voice-over-IP function to transmit the context data,
   wherein at least one action by the receiver is triggered based on the context data.

2. The method of claim 1, wherein the receiver is a second communication terminal or a server communication device.

3. The method of claim 2, wherein the transmitted data sent to the receiver enables the receiver to output user information corresponding to the captured motion information.

4. The method of claim 2, comprising:
   outputting, by the receiver, the user information visually or audio-visually.

5. The method of claim 1, comprising transmitting data of the captured motion information via a packet-based network.

6. The method of claim 1, comprising agreeing upon communications modalities between the first communication terminal and the receiver via a protocol that enables the context data to be transmitted using a pre-selected data format.

7. The method of claim 6, wherein the pre-selected data format enables the transmission of the context data to include spatial coordinates and time inputs.

8. The method of claim 7, wherein the communications modalities are agreed upon using Session Initiation Protocol and the data of the digital signal is transmitted using Real-Time Transport Protocol.

9. The method of claim 1, wherein the data from the digital signal comprises information of at least one member of the group consisting of motion vectors, spatial coordinates, velocities, acceleration rates of the moved object, and time information associated with at least one of the motion vectors, the spatial coordinates, the velocities, and the acceleration rates.

10. The method of claim 1, wherein the context data comprises a textual description of a motion sequence and a meaning of the motion sequence.

11. The method of claim 2, comprising:
capturing motion information via a capturing device registering motion of an object via at least one sensor and converting the registered motion into the digital signal that is sent to a first communication terminal.

12. The method of claim 11, wherein the capturing device is comprised of a video camera, and wherein the context data is comprised of information identifying an affirmative response based on data of the digital signal indicating the object moved upward and downwards received by the first communication terminal.

13. The method of claim 2, wherein at least the first communication terminal is comprised of a computer device equipped with software that provides the Voice-over-IP function.

14. The method of claim 1, wherein the context data is sent by the first communication terminal in a message that includes information identifying a direction of motion and information defining a context of that motion information, the information defining the context of the motion comprises one of:
(i) information identifying that a yes response is indicated by upward motion or downward motion and that a no response is indicated by leftward motion or rightward motion, and
(ii) information identifying that a response to direct attention to an observer of the object is indicated by upward motion, downward motion, or sideward motion.

15. A system for capturing and transmitting motion data, comprising:
a first communication terminal configured to receive a digital signal, data of the digital signal comprising features derived or extracted from video sequences, the first communication terminal configured to determine context data based on the data of the digital signal by the first communication terminal, and the first communication terminal configured to send the context data together with the data from the digital signal or instead of the data from the digital signal to a receiver, the context data describing a gesture made by an object by identifying a relative change in a relative direction of the object and a meaning of that identified relative change, the first communication terminal having a Voice-over-IP function to transmit the context data,
wherein at least one action by the receiver is triggered based on the context data.

16. The system of claim 15, comprising the receiver, the receiver being a second communication terminal or a server computer device, the receiver being communicatively connectable to the first communication terminal.

17. The system of claim 15, comprising:
a capturing device communicatively connectable to the first communication terminal, the capturing device configured to send the digital signal to the first communication terminal.

18. The system of claim 15, wherein the first communication terminal is configured so that the context data is sent by the first communication terminal in a message that includes information identifying a direction of motion and information defining a context of that motion information; and
wherein the first communication terminal is comprised of a computer device equipped with software that provides the Voice-over-IP function.

19. The system of claim 18, wherein the information defining the context of the motion comprises information identifying that a yes response is indicated by upward motion or downward motion and that a no response is indicated by leftward motion or rightward motion.

20. The system of claim 18, wherein the information defining the context of the motion comprises information identifying that a response to direct attention to an observer of the object is indicated by upward motion, downward motion, or sideward motion.

* * * * *